United States Patent [19]
Kirby et al.

[11] 3,720,687
[45] March 13, 1973

[54] FURAN AND THIOPHENE SUBSTITUTED VINYL PHOSPHATES

[75] Inventors: Peter Kirby, Bearsted, England; Duane K. Hass, Modesto, Calif.

[73] Assignee: Shell Oil Company, New York, N.Y.

[22] Filed: Sept. 19, 1969

[21] Appl. No.: 859,562

[52] U.S. Cl. ......260/332.5, 260/302 E, 260/306.8 R, 260/307 R, 260/309, 260/326.61, 260/332.2 A, 260/332.3 R, 260/346.1 R, 260/347.2, 260/347.7, 260/347.8, 424/200, 424/202, 424/203
[51] Int. Cl.......A61k 27/00, C07d 5/18, C07d 63/14
[58] Field of Search..260/329 P, 332.5, 957, 346.1 R

[56] References Cited

UNITED STATES PATENTS

| | | | |
|---|---|---|---|
| 2,964,528 | 12/1960 | Wicker et al. | 260/294.8 |
| 3,018,215 | 1/1962 | Pianka | 167/22 |
| 3,364,109 | 1/1968 | Haering | 167/42 |
| 3,536,791 | 10/1970 | Morales et al. | 260/957 |
| 3,468,946 | 9/1969 | Bayer et al. | 260/543 |
| 2,706,194 | 4/1955 | Morris et al. | 260/247 |
| 3,496,231 | 2/1970 | Maier | 260/583 |
| 3,359,276 | 12/1967 | Nielsen et al. | 260/309 |
| 3,567,803 | 3/1971 | Ward et al. | 260/972 |

FOREIGN PATENTS OR APPLICATIONS

| | | | |
|---|---|---|---|
| 1,251,745 | 10/1967 | Germany | 260/957 |
| 1,550,540 | 11/1968 | France | 260/957 |

*Primary Examiner*—John D. Randolph
*Assistant Examiner*—Cecilia M. S. Jaisle
*Attorney*—Frank R. La Fontaine and Marion W. Western

[57] ABSTRACT

Novel heterocyclic substituted aliphatic esters of beta-chloro-substituted vinyl phosphates are useful in the control of internal helminth parasites of warm-blooded animals.

9 Claims, No Drawings

FURAN AND THIOPHENE SUBSTITUTED VINYL PHOSPHATES

BACKGROUND OF THE INVENTION

1. Field of the Invention

This invention relates to novel heterocyclic-substituted aliphatic esters of beta-chloro-substituted vinyl phosphates. More particularly, this invention relates to heterocyclic substituted aliphatic esters of beta-chloro-substituted vinyl phosphates wherein the heterocyclic moiety is a five-membered ring as more specifically described hereinafter.

This invention also relates to the use of novel heterocyclic substituted aliphatic esters of beta-chloro-substituted vinyl phosphates for the control of internal helminth parasites in warm-blooded animals.

2. Description of the Prior Art

Dialkyl beta-chloro-substituted vinyl phosphates are a known class of insecticides (U.S. Pats. Nos. 2,956,073; 3,116,201; U.S. Pat. No. 3,299,190 covering a particular subclass) that also are known to be useful as anthelmintics (U.S. Pats. Nos. 3,166,472; 3,264,184; 3,318,769; Canadian Patent 731,113). However, as is pointed out in these latter patents, the phosphates of this class are quite toxic to warm-blooded animals, and their therapeutic ratio (ratio of maximum tolerated dose to the minimum effective dose needed to control the parasites) is not as large as could be desired, and according to these patents, safe use of these compounds as anthelmintics requires that they be formulated in a thermoplastic resin or activated carbon which so controls the rate at which the compound is released in the host animal that the parasites are killed without harm to the animal. Further, these anthelmintics as a class have been found to exhibit relatively low activity with respect to tapeworms.

Alkyl aralkyl beta-chloro-substituted vinyl phosphates useful as insecticides are generically taught by Belgian Patents 689,778 and 694,814, however, only methyl benzyl 2,2-dichlorovinyl phosphate is specifically disclosed. A specific class of alkyl aralkyl beta-chloro-substituted vinyl phosphates useful as anthelmintics is taught in copending application Ser. No. 819,978, filed Apr. 28, 1969, and now abandoned.

SUMMARY OF THE INVENTION

It has now been found that compounds having the formula

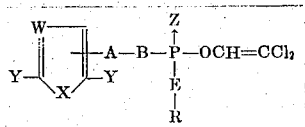

Wherein
W is CH or N
X is O, S or NR'
Y is H, Cl, Br or CH$_3$
Z is O or S
B and E are O or NR' with the proviso that at least one of B and E must be O
A is C$_1$ to C$_5$ alkylene or C$_2$ to C$_5$ alkenylene
R is C$_1$ to C$_4$ alkyl or C$_3$ to C$_4$ alkenyl or H when E is NR'
R' is H, C$_1$ to C$_4$ alkyl or C$_3$ to C$_4$ alkenyl are highly active anthelmintics with respect to one or more species of helminths, yet are relatively non-toxic to warm-blooded animals. These compounds can be safely administered to animals by persons without special training and without exercising more than ordinary care and without special formulations.

DESCRIPTION OF THE PREFERRED EMBODIMENTS

The preferred compounds of this invention can be described by the following formula:

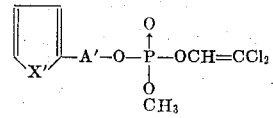

wherein
X' is O or S
A' is C$_2$ to C$_5$ alkylene or alkenylene.
Representative of such compounds are:
methyl 3-(2-thienyl)propyl 2,2-dichlorovinyl phosphate;
methyl 4-(2-thienyl)butyl 2,2-dichlorovinyl phosphate;
methyl 5-(2-thienyl)pentyl 2,2-dichlorovinyl phosphate;
methyl 4-(2-thienyl)-3-butenyl 2,2-dichlorovinyl phosphate;
methyl 3-(2-furyl)propyl 2,2-dichlorovinyl phosphate;
methyl 4-(2-furyl)butyl 2,2-dichlorovinyl phosphate;
methyl 4-(2-furyl)-3-butenyl 2,2-dichlorovinyl phosphate.

The compounds of this invention may be prepared by reacting 2,2-dichlorovinyl phosphorodichloridate with an appropriate heterocyclic alkyl or alkenyl alcohol or amine effecting replacement of one of the chlorine atoms bonded to the phosphorus atom, followed by reacting the resulting phosphoro-chloridate with the appropriate second alcohol or amine to effect replacement of the remaining chlorine atoms. When using an alcohol the process proceeds according to the equation:

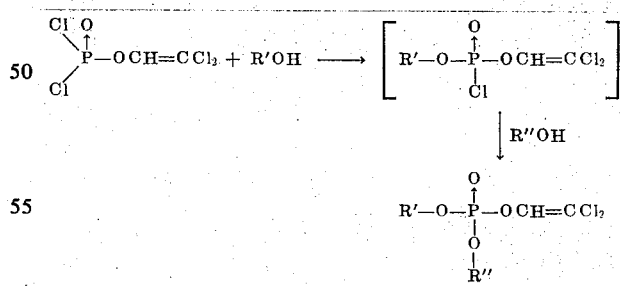

wherein R' is the heterocyclic alkyl or alkenyl group.

The phosphorodichloridate may be formed by reacting dimethyl 2,2-dichlorovinyl phosphate with thionyl chloride as described in Belgian Patent 594,814 and German Patent 1,263,984. The reaction of the phosphorodichloridate with an alcohol is also described in these patents. The reaction of the phosphorodichloridate with an amine in an alcohol is further taught in Netherlands Patent 6,806,396.

The heterocyclic alcohols may be obtained commercially or prepared by various methods known to the art. One method of preparing heterocyclic alkyl or alkenyl alcohols follows and is illustrated by the reaction sequence:

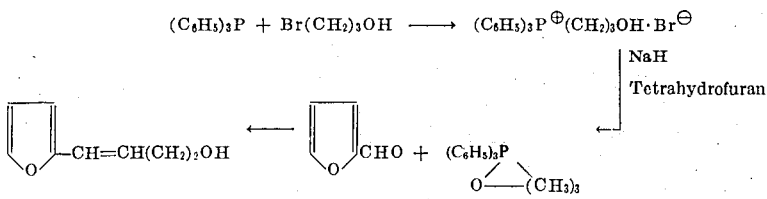

Another method which may be used follows the reaction sequence:

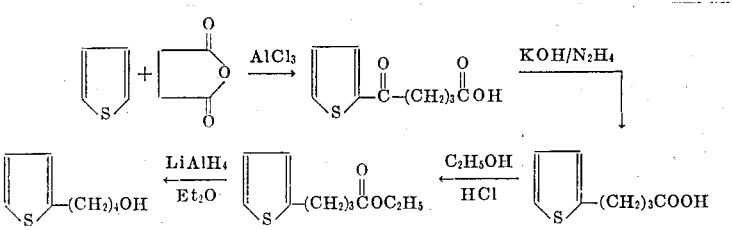

In order to demonstrate more fully the preparation of the compounds of the invention the following examples are given.

EXAMPLE I

Preparation of methyl 3-(2-thienyl)propyl 2,2-dichlorovinyl phosphate

A. Preparation of 3-(2-thienyl)propyl alcohol

A mixture of 0.72 mole of triphenylphosphine and 0.72 mole of ethyl bromo-acetate was refluxed in benzene for 24 hours, cooled, filtered and washed with diethyl ether. The product produced had the formula

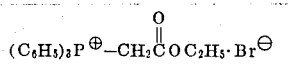

This product was reacted with an equimolar quantity of 2-thiophene-carboxaldehyde in the presence of ethylene oxide in methylene chloride ($CH_2Cl_2$) while being cooled in an icebath. After standing overnight the reaction mixture was distilled under vacuum and a product of the formula

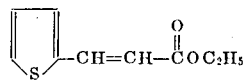

was obtained in 88 percent yield.

The product from the above step was mixed with ether and added dropwise into an ether suspension of lithium aluminum hydride ($LiAlH_4$). The mole ratio of product added to $LiAlH_4$ was about 0.5. After refluxing for two hours this mixture was cooled and hydrochloric acid added until the reaction mixture was acidic. The reaction mixture was extracted with ether and distilled at 0.2 Torr. and 70° C to give a clear liquid which upon analysis was shown to be a 71 percent yield of 3-(2-thienyl)propyl alcohol.

B. Preparation of methyl 3-(2-thienyl)propyl 2,2-dichlorovinyl phosphate 0.04 mole of 3-(2-thienyl)propyl alcohol, 0.04 mole of triethyl amine and 0.04 mole of 2,2-dichlorovinyl phosphorodichloridate in anhydrous benzene were stirred together in an ice bath for three hours and then 0.04 mole of anhydrous methanol was added with an additional 0.04 mole of triethyl-amine in anhydrous benzene. After complete addition the solution was allowed to come to room temperature and stored overnight. The mixture was then filtered, the solids were washed with benzene and the washing combined with the filtrate and the resulting liquid stripped and molecularly distilled at 0.00015 Torr. and 150° C to give an 81 percent yield of methyl 3-(2-thienyl)propyl 2,2-dichlorovinyl phosphate, identified by elemental analysis.

EXAMPLE 2

Preparation of methyl 5-(2-thienyl)pentyl 2,2-dichlorovinyl phosphate

A. Preparation of 5-(2-thienyl)pentanol

To equal molar quantities (0.44 mole each) of glutaric anhydride, and thiophene in dry benzene was added 0.44 mole of freshly distilled stannic chloride dropwise with cooling. The mixture was stirred for one hour at room temperature and then hydrochloric acid was added. The benzene and aqueous phases that formed on standing were separated. The benzene layer was washed with water and the aqueous layer with benzene. The combined benzene fractions were extracted with aqueous sodium carbonate. The sodium carbonate solution was made acidic with hydrochloric acid and extracted with methylene chloride ($CH_2Cl_2$). The $CH_2Cl_2$ extract was evaporated to yield a gum which was taken up again in $CH_2Cl_2$ diluted with hexane. The solution was cooled and a precipitate was filtered. The filtrate was evaporated and treated with charcoal yielding additional precipitate. The precipitates were a compound of the formula:

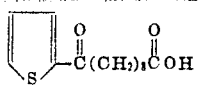

0.18 mole of the above precipitate was refluxed with 0.55 mole of potassium hydroxide and 25 milliliters of hydrazine hydrate for two hours to remove the water. The mixture was refluxed an additional 4 hours at 235° C after which it was cooled and 250 milliliters of water was added. This mixture was poured into 200 milliliters of 6N hydrochloric acid and extracted with methylene chloride. The extract was dried with magnesium sulfate and evaporated yielding 0.18 mol of a product of the formula:

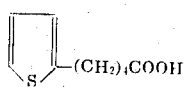

0.049 mole of the above 5-(2-thienyl)pentanoic acid was placed in 100 milliliters of anhydrous methyl alcohol and 11 milliliters of thionyl chloride was added dropwise with cooling and stirred overnight to yield 0.049 mole of a compound of the formula:

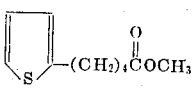

This thienylvalerate ester was dropped into a lithium aluminum hydride suspension in anhydrous ether with cooling. After addition of all of the ester the mixture was refluxed for 1 hour and then hydrochloric acid was added dropwise with cooling. The ether layer separated. The aqueous layer was extracted with ether and the combined extract dried with magnesium sulfate and evaporated to produce the 5-(2-thienyl)pentyl alcohol of the formula:

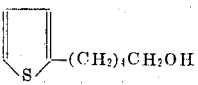

B. Preparation of methyl 5-(2-thienyl)pentyl 2,2-dichlorovinyl phosphate

To a solution of 0.047 mole 2,2-dichlorovinyl phosphorodichloridate in 100 milliliters of anhydrous benzene was added dropwise a mixture of 0.047 5-(2-thienyl)pentyl alcohol and 0.047 mole triethylamine at 0°–5° C. After complete addition, the mixture was stirred for three hours. Stirring was continued with the addition of 0.047 mole of anhydrous methyl alcohol and 0.047 mole of triethylamine in 25 milliliters of benzene at 0°–5° C. This mixture was allowed to come to room temperature, stirred overnight and filtered. The filtrate was evaporated to remove benzene and then distilled in a molecular still to produce the final product having the formula

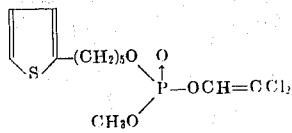

EXAMPLE 3

Preparation of methyl 4-(2-furyl)butyl 2,2-dichlorovinyl phosphate

In a procedure similar to that of Examples 1 and 2 the following reactions were carried out:

A.

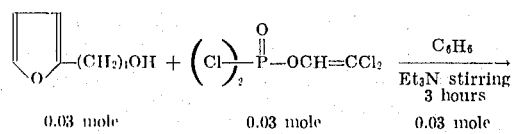

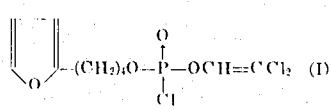

B.

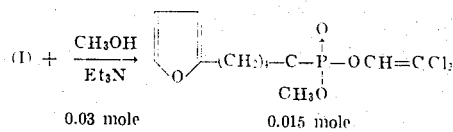

The identity of the product was established by elemental analysis and confirmed by infra-red spectrum analysis.

EXAMPLE 4

Preparation of methyl 4-(2-furyl)-3-butenyl 2,2-dichlorovinyl phosphate

By following the procedure similar to Examples 1 and 2 the following reactions were carried out:

A.

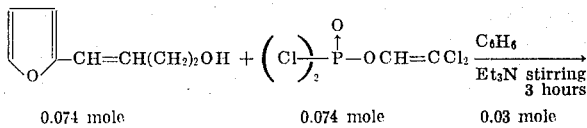

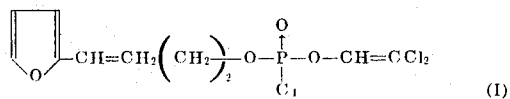

B. (I)

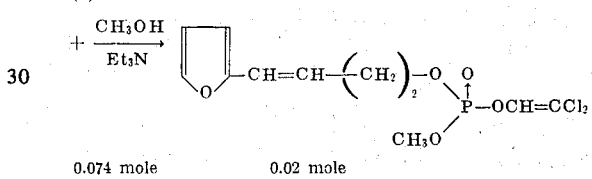

The identity of the product was established by elemental analysis and confirmed by infra-red spectrum analysis.

EXAMPLE 5

Preparation of methyl 4-(2,5-dichloro-3-thienyl)-3-butenyl 2,2-dichlorovinyl phosphate Again following the procedures of Examples 1 and 2 the following reactions were carried out:

A.

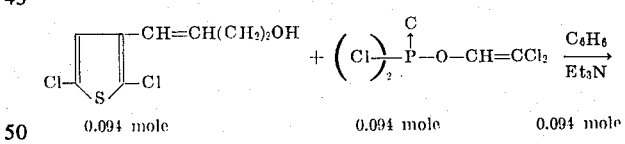

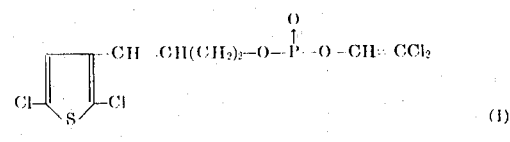

B. (I)

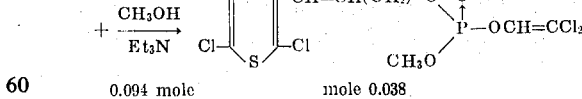

The identity of the product was established by elemental analysis and confirmed by infra-red spectrum analysis.

EXAMPLE 6

Methyl 4-(2-thienyl)-3-butenyl 2,2-dichlorovinyl phosphate

Using the procedure of Examples 1 and 2 the following reaction sequence was accomplished:

A.

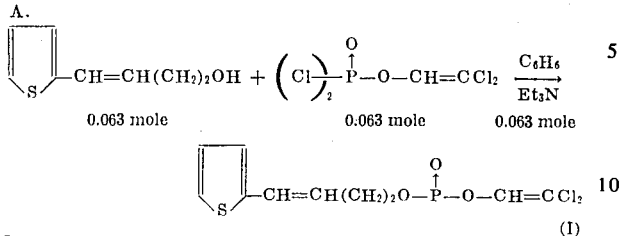

B.

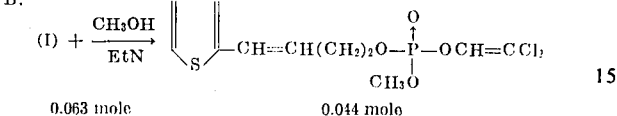

The identity of the product was established by elemental analysis and confirmed by infra-red spectrum analysis.

EXAMPLE 7 n-butyl 4-(2-thienyl)butyl 2,2-dichlorovinyl phosphate

Following the procedure substantially as outlined in Examples 1 and 2 the following reactions were carried out:

A.

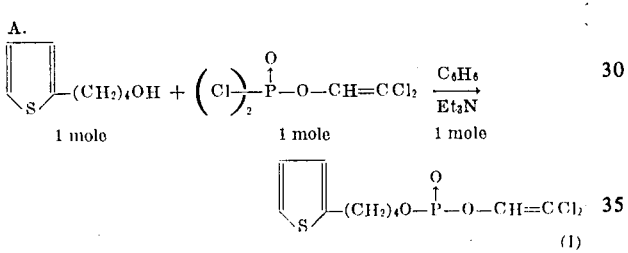

B.

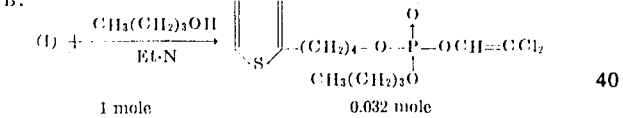

The identity of the product was established by elemental analysis and confirmed by infra-red spectrum analysis.

EXAMPLE 8

Preparation of methyl 4-(2-thienyl)butyl 2,2-dichlorovinyl phosphate

Following the procedures of the above examples, the following reactions were carried out:

A.

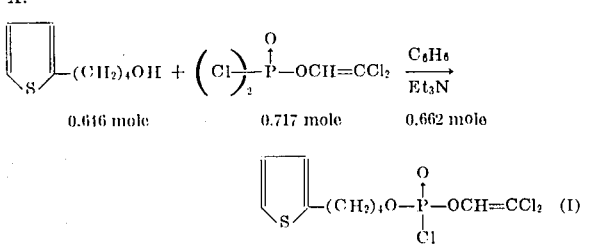

B.

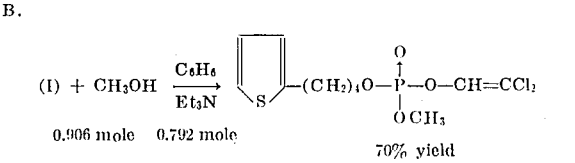

By following the procedures of the above examples, the following compounds can also be prepared.

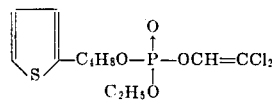

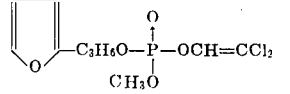

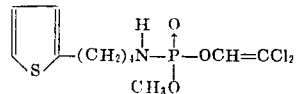

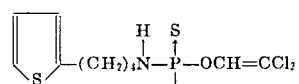

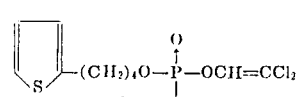

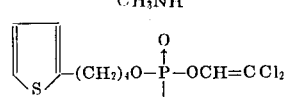

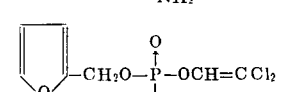

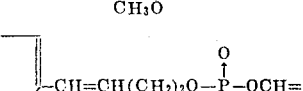

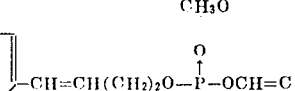

The activity of the compounds of this invention with respect to helminth-parasites of warm-blooded animals, and their relatively low toxicity with respect to the host animals — that is, their high therapeutic ratio — was demonstrated by the following tests:

Mammalian Toxicity:

This is defined as the maximum tolerated dose (MTD), milligrams of test compound per kilogram of animal body weight, and was determined as follows: by intubation a group of mice was treated with various dosages in milligrams of test compound per kilogram of mouse body weight. The highest dosage at which all of the mice survived was the maximum tolerated dosage (MTD).

Anthelmintic Activity:

This is reported as the minimum effective dosage (MED), milligrams of test compound per kilogram of animal body weight, to effect a certain standard of clearance of parasites from the host animal. It was determined in any given case as follows: A group of 5 mice, parasitized by tapeworm, *Hymenolepis nana*, and pinworm, *Syphacia obvelata*, was treated, by intubation with a single dose of the test compound, the dosage being less than the MTD. The treated mice were kept from feed and water for 24 hours following treatment, then the mice were sacrificed and the intestinal tract was examined for the presence of parasites. If 60 percent or more of the mice were completely cleared on one and/or the other of the species of parasites, the test was replicated and if the results were confirmed, additional groups of parasitized mice were treated with successively lower dosages of the test compound to ascertain the minimum dosage required to clear 60 percent or more of the mice completely of one and/or the other of the two species of parasites.

A group of two rats parasitized by the roundworm, *Nippostrongylus braziliensis*, was treated by intubation with a single dose of the test compound, the dosage being less than the MTD. The treated rats were kept from feed and water for 24 hours following treatment, then the rats were sacrificed and the intestinal tract examined for the presence of parasites which are counted individually. If the parasite populations were reduced by 90 percent or greater, the test was replicated and if the results were confirmed, additional groups of parasitized rats were treated with successively lower dosages of the test compound to ascertain the minimum dosage required to clear 75 percent or more of the parasites from infected rats.

Therapeutic Ratio:

This is expressed as the ratio of the MTD to the MED. Obviously, the higher the therapeutic ratio the safer the compound is for administration to warm-blooded animals.

Representative compounds of the invention were evaluated according to this procedure. The results were as follows:

The compounds of this invention can be employed as an anthelmintic by the conventional means and techniques employed in the anthelmintic art.

These phosphates can be used to control a wide spectrum of endoparasitic roundworms, pinworms, whipworms, hookworms, threadworms, cecal worms, stomach worms, hairworms, threadnecked worms, cooperias, and the like. Some may act topically, some may act systemically, and thus can control internal larvae forms of such parasites as heel flies, bot flies and the like. Thus, the compound of this invention can be used to control species of endoparasites of the genera: Haemonchus, Trichostrongylus, Ostertagia, Cooperia, Trichuris, Oesophagostomum, Strongloides, Ascaris, Nematodirus, Ancylostoma, Necator, Gasterophilus, Nematospiroides, Syphacia, to name some typical genera.

This compound can further be used to control flatworms (tapeworms) of the Cestoda, such as species of the genera: Hymenolepis, Moniezia, Anoplocephala, Paranoplocephala, Thysanosoma, Taenia, Multiceps, Echinococcus, Dipylidium, Diphyllobothrium, Mesocestoides, and the like.

These new anthelmintics are effective in controlling endoparasites of mammals and birds, generally, and

TABLE I

Compound $$\begin{matrix} R-O & O \\ & \nwarrow\uparrow \\ & P-OCH=CCl_2 \\ & \swarrow \\ R_1-O & \end{matrix}$$

| R | $R_1$ | Mouse | | | Rat | |
|---|---|---|---|---|---|---|
| | | MTD* | Therapeutic ratio | | MTD* | Therapeutic ratio, roundworm |
| | | | Tapeworm | Pinworm | | |
| 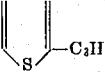—$C_3H_6$ | $CH_3$ | 250 | 4 | 62 | 250 | 4 |
| 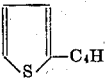—$C_4H_8$ | $CH_3$ | 250 | 4 | 31 | 250 | 8 |
| 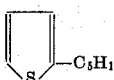—$C_5H_{10}$ | $CH_3$ | 250 | 1 | 16 | 500 | 4 |
| —$C_4H_8$ | $C_2H_5$ | 125 | 4 | 62 | 62 | 4 |
| 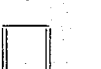—$C_4H_8$ | $C_4H_8$ | 125 | 8 | 16 | 62 | 2 |
| 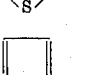—$CH=CH(CH_2)_2$ | $CH_3$ | 250 | 1 | 31 | 250 | 8 |
| 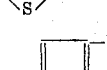—$CH=CH(CH_2)_2$ | $CH_3$ | 500 | 8 | 8 | 500 | 4 |
| 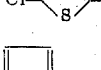—$C_4H_8$ | $CH_3$ | 250 | 1 | 16 | 125 | 8 |
| 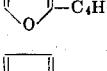—$CH=CH(CH_2)_2$ | $CH_3$ | 500 | 2 | 31 | 250 | 8 |
| 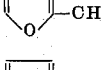—$C_3H_5$ | $CH_3$ | 125 | 1 | 31 | 125 | 1 |

*Milligrams drug per kilogram of animal body weight when administered orally.

more particularly, in controlling endoparasites in livestock, such as cattle, swine, sheep and goats, in domestic pets, such as dogs and cats, in rabbits, in poultry such as chickens, turkeys, ducks, geese and the like, and in fur-bearing animals, such as mink, foxes, chinchilla, in zoo animals, and the like.

They can be used to eradicate parasites already present, and/or they can be used prophylactically — that is, they can be used to cure an already present worm infestation, and can be used to prevent infestation.

The dosage of the anthelmintic to be used will depend upon the particular kind or kinds of parasites to be controlled, the kind of host animal, whether the anthelmintic is to be used to cure an already existing infection, or merely as a prophylactic; and the like. These factors are those ordinarily encountered in the treatment of animals to cure and/or prevent their infestation by endoparasites; these factors and their solution are all well known to the practitioners of the art. In general, however, larger dosages are required to cure an already existing infestation than are required for prophylaxis. Thus, dosages of the anthelmintic to provide as little as 1 milligram of the anthelmintic per kilogram of the live body weight of the animal fed at regular intervals — twice daily or daily, for example — may be sufficient to prevent infestation of animals by endoparasites. However, prophylactic dosages ordinarily will amount to about 2–10 milligrams of the anthelmintic per kilogram of the animal body weight. The dosage required to eradicate already existing endoparasites ordinarily will be at least about 5 milligrams of the anthelmintic per kilogram of the animal body weight, with usual dosages being about 5 to 50 milligrams on the same basis. The maximum dosage, of course, in every case will be determined by the toxicity of the anthelmintic to the host animal. The anthelmintic of this invention provides an excellent therapeutic ratio — effectively eradicating endoparasites without ill effect upon the host animal.

We claim as our invention:

1. A compound of the formula

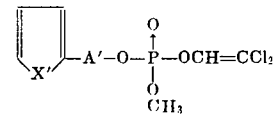

wherein
X' is O or S
A' is $C_3$ to $C_5$ alkylene or alkenylene.

2. A compound according to claim 1 wherein X' is S.
3. A compound according to claim 2 wherein A' is — $CH_2CH_2CH_2$—.
4. A compound according to claim 2 wherein A' is — $CH_2CH_2CH_2CH_2$—.
5. A compound according to claim 2 wherein A' is — $CH=CHCH_2CH_2$—.
6. A compound according to claim 1 wherein X' is O.
7. A compound according to claim 6 wherein A' is — $CH_2CH_2CH_2$—.
8. A compound according o claim 6 wherein A' is — $CH_2CH_2CH_2CH_2$—.
9. A compound according to claim 6 wherein A' is — $CH=CHCH_2CH_2$—.

* * * * *